US012770413B2

(12) United States Patent
Chu et al.

(10) Patent No.: US 12,770,413 B2
(45) Date of Patent: Oct. 20, 2026

(54) CONTROL METHOD AND DEVICE BASED ON COMPUTER VISION

(71) Applicant: NEW-FAST TECHNOLOGY CO., LTD., Hsinchu County (TW)

(72) Inventors: Yu-Ying Chu, Hsinchu County (TW); Jen-Te Liao, Hsinchu County (TW)

(73) Assignee: NEW-FAST TECHNOLOGY CO., LTD., Hsinchu County (TW)

(*) Notice: Subject to any disclaimer, the term of this patent is extended or adjusted under 35 U.S.C. 154(b) by 195 days.

(21) Appl. No.: 18/906,903

(22) Filed: Oct. 4, 2024

(65) Prior Publication Data

US 2025/0378698 A1 Dec. 11, 2025

(30) Foreign Application Priority Data

Jun. 5, 2024 (TW) ................................ 113120881

(51) Int. Cl.
*G06V 20/62* (2022.01)
*G06V 20/64* (2022.01)

(52) U.S. Cl.
CPC .............. *G06V 20/62* (2022.01); *G06V 20/64* (2022.01)

(58) Field of Classification Search
CPC ............................... G06V 20/62; G06V 20/64
See application file for complete search history.

(56) References Cited

U.S. PATENT DOCUMENTS

| | | | | |
|---|---|---|---|---|
| 10,319,092 | B2 * | 6/2019 | Wu | G01N 35/00871 |
| 10,325,182 | B2 * | 6/2019 | Soomro | G06V 10/25 |
| 10,395,357 | B2 * | 8/2019 | Vivet | G01N 21/9027 |
| 12,125,074 | B2 * | 10/2024 | Porter | G06V 10/764 |

FOREIGN PATENT DOCUMENTS

| | | |
|---|---|---|
| CN | 114761810 A | 7/2022 |
| CN | 116267625 A | 6/2023 |
| TW | 202030481 A | 8/2020 |

OTHER PUBLICATIONS

Office Action dated Mar. 14, 2025 of the corresponding Taiwan patent application No. 113120881.

* cited by examiner

*Primary Examiner* — Gregory M Desire
(74) *Attorney, Agent, or Firm* — HDLS IPR SERVICES; Chun-Ming Shih

(57) ABSTRACT

A control method based on computer vision is disclosed, the method includes: photographing multiple sample bottles on a tray in a top-view manner to generate a top-view image; performing an object detection process on the top-view image to identify a type of a label on a cap of each sample bottle and a placement position of each sample bottle in a chamber; dividing the multiple sample bottles into multiple groups based on the respective types of the multiple labels, and sorting the multiple groups to generate a sampling order; controlling an actuator to drive a detector bar on a lifting arm in the actuator to sequentially collect samples in the multiple groups based on the sampling order and the multiple placement positions.

8 Claims, 10 Drawing Sheets

CONTROL METHOD AND DEVICE BASED ON COMPUTER VISION

BACKGROUND OF THE DISCLOSURE

Technical Field

The disclosure relates to techniques for an image process, particularly relates to a control method and device based on computer vision.

Description of Related Art

At present, trace elements are detected by usually placing sample bottles containing the trace elements in a detection device, and the trace elements in these sample bottles are detected by automated control of the detection device. However, these sample bottles can contain the same or different types of the trace elements. In order for the detection device to automatically and correctly collect and detect samples in these sample bottles, a user needs to place the sample bottles in a tray of the detection device based on a predefined placement manner, or to place the sample bottles based on predefined sampling positions and a sampling sequence. In this way, the detection device performs different test manners on different types of samples in the sample bottles in sequence. However, whenever detection is required, it takes labor and time to rearrange the sample bottles or to reset the sample type for each sample bottle at each sampling position. Therefore, saving the labor and the time for quickly detecting the samples in the sample bottles is an urgent requirement for technicians in this field.

SUMMARY OF THE DISCLOSURE

The purpose of the disclosure is to provide a control method and a device based on computer vision that save labor and time for quickly detecting samples in sample bottles.

In order to achieve the above purpose, the disclosure provides the control method based on computer vision for a detection device including a chamber, a tray, and an actuator, where the control method includes:

- by a camera circuit disposed above the tray, photographing multiple sample bottles on the tray to generate a top-view image;
- by a processor, performing an object detection process on the top-view image to identify a type of a label on a cap of each of the sample bottles and a center point of a label object corresponding to each of the labels in the top-view image, and converting a position of each of the center points in the top-view image into a placement position of each of the sample bottles in the chamber;
- by the processor, dividing the multiple sample bottles into multiple groups based on respective type of the multiple labels, and sorting the multiple groups to generate a sampling order, where the multiple groups respectively correspond to different testing manners and different sample types; and
- by the processor, controlling the actuator to drive a detector bar on a lift arm in the actuator to sequentially collect samples in the sample bottles included in each of the multiple groups based on the sampling order and the multiple placement positions.

In order to achieve the above purpose, the disclosure provides the control device based on computer vision for controlling a detection device including a chamber, a tray, and an actuator, where the control device includes:

- a camera circuit, disposed above the tray, and configured for photographing multiple sample bottles on the tray to generate a top-view image; and
- a processor, connected to the camera circuit, configured for executing following steps:
- performing an object detection process on the top-view image to identify a type of a label on a cap of each of the sample bottles and a center point of a label object corresponding to each of the labels in the top-view image, and converting a position of each of the center points in the top-view image into a placement position of each of the sample bottles in the chamber;
- dividing the multiple sample bottles into multiple groups based on respective type of the multiple labels, and sorting the multiple groups to generate a sampling order, where the multiple groups respectively correspond to different testing manners and different sample types; and
- controlling the actuator to drive a detector bar on a lift arm in the actuator to sequentially collect samples in the sample bottles included in each of the multiple groups based on the sampling order and the multiple placement positions.

Compared to related technologies, the disclosure utilizes an object detection process to identify the types of the labels on the caps of the sample bottles and the positions of the labels, and then divides the different types of the labels into groups. In this way, the disclosure enables sampling the samples in the sample bottles requiring different testing manners in sequence, which avoids the problem of frequently switching the testing manners while sampling. In addition, since the user does not need to place the sample bottles in the tray in a specific way in advance, and does not need to set the sample type for each sample bottle after the sample bottles have been placed, the disclosure further saves the labor and the time for quickly detecting the samples in the sample bottles.

DETAILED DESCRIPTION

Figure 1:
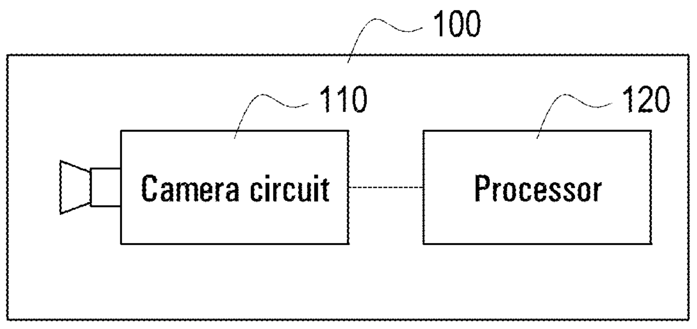
FIG. 1 illustrates a block diagram of a control device based on computer vision in some embodiments of the disclosure.

Reference is made to FIG. 1, and FIG. 1 illustrates a block diagram of a control device 100 based on computer vision in some embodiments of the disclosure. As shown in FIG. 1, the control device 100 based on computer vision of the disclosure includes a camera circuit 110 and a processor 120, where the camera circuit 110 and the processor 120 are connected to each other.

In this embodiment, the control device 100 is suitable for controlling a detection device. Specifically, the detection device is among various detection devices for trace elements. The detection device is an automated device for sampling and detecting the trace elements, where the detection device includes a chamber, a tray, and an actuator (to be described later). The camera circuit 110 is disposed above the tray and photographs multiple sample bottles on the tray in a top-view manner (i.e., with a photographing direction facing the tray) to generate a top-view image. In some embodiments, the camera circuit 110 is implemented by any circuit having image capture capabilities and the top-view image includes images of all sample bottles placed in the tray. In this embodiment, the camera circuit 110 and the processor 120 execute a control method based on computer vision in subsequent paragraphs. In some embodiments, the processor 120 controls movement and rotation of components in the actuator. In some embodiments, processor 120 is implemented by a central processing unit (CPU), a micro control unit (MCU), a programmable logic controller (PLC), a system on chip (SoC), a system on chip (SoC), or field programmable gate array (FPGA), but not limited thereto.

Figure 2:
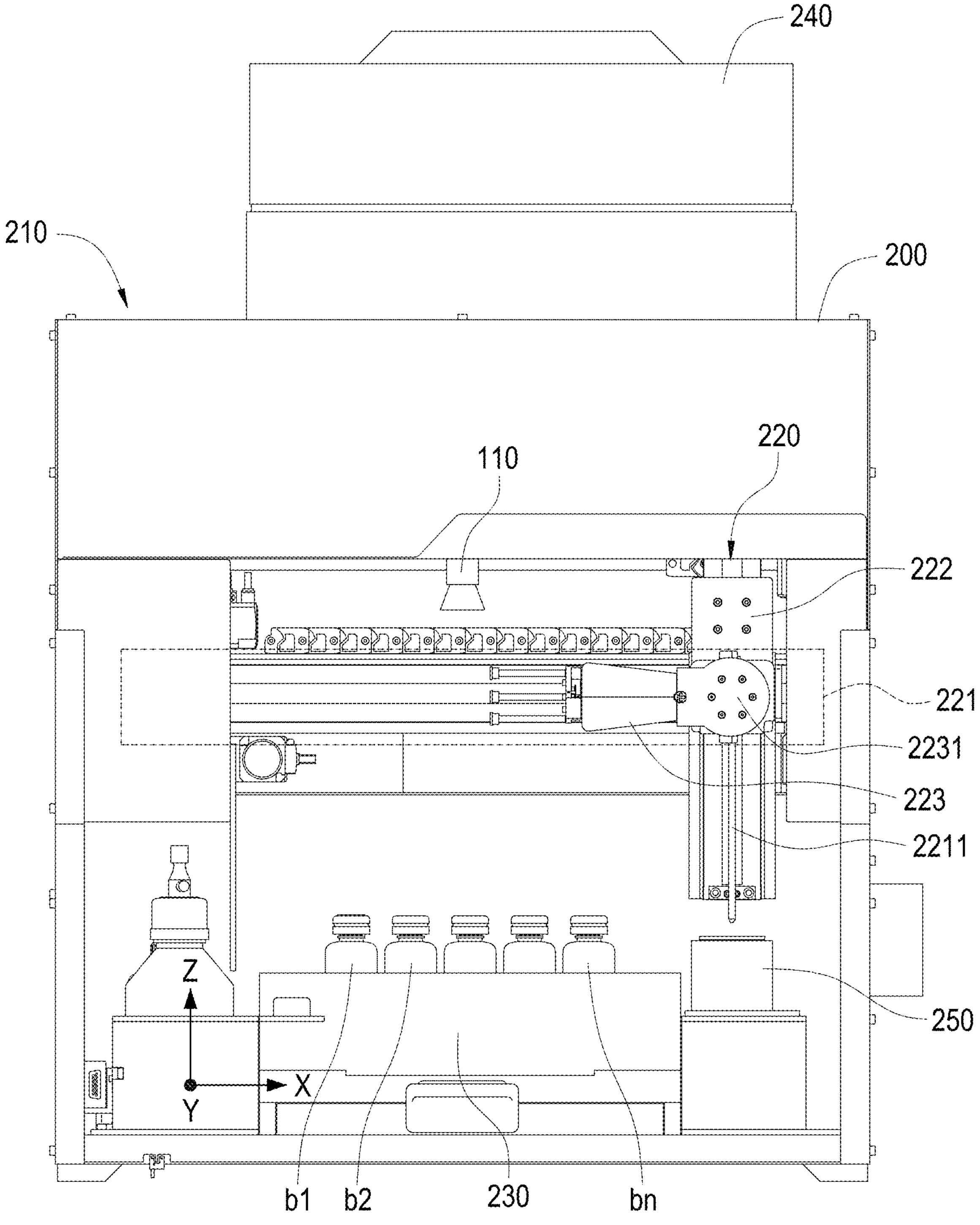
FIG. 2 illustrates a schematic diagram of a disposed manner for a camera circuit in some embodiments of the disclosure.

In order for understanding a structure of the detection device, control of the processor 120 to the components in the actuator, and a disposed manner of the camera circuit 110, the structure of the detection device, the control of the processor 120 to the components in the actuator, and the disposed manner of the camera circuit 110 are further explained below by a practical example. Reference is made to FIG. 2, and FIG. 2 illustrates a schematic diagram of the disposed manner of the camera circuit 110 in some embodiments of the disclosure. As shown in FIG. 2, the detection device 200 includes the chamber 210, the actuator 220, and the tray 230.

The tray 230 is disposed in the chamber 210. The tray 230 carries the multiple sample bottles b1-bn having caps, where n is a positive integer and can be further adjusted according to the requirement of a user without any particular limitation. Each of the sample bottles b1-bn contains the trace element to be detected. The actuator 220 is disposed in the chamber 210 and disposed on an upper position opposite to the tray 230. The actuator 220 includes a slide 222, a lift arm 221 sliding on the slide 222, and a gripper 223 capable of oscillating on the lift arm 221. The lift arm 221 has a detector bar 2211 for sampling, and the detector bar 2211 is disposed in a direction parallel to a Z-axis direction.

In some embodiments, the processor 120 controls the slide 222 in the actuator 220 to drive the lift arm 221 to move in an XY plane, two lateral rails in the slide 222 are respectively fixed to left and right inner walls of the chamber 210 to drive the lift arm 221 to move along a Y-axis direction, and a middle rail in the slide 222 is movably disposed between the two lateral rails to drive the lift arm 221 to move along an X-axis direction. In some embodiments, the processor 120 controls movement of the lift arm 221 in the actuator 220 along the Z-axis direction.

In some embodiments, the processor 120 controls the gripper 223 in the actuator 220 to rotate centered on a pivot 2231 (i.e., clockwise or counterclockwise rotation along the Y-axis direction) so that makes a setting direction of the gripper 223 parallel to the X-axis direction or parallel to the Z-axis direction. In some embodiments, the detection device 200 further includes a washer 250 for cleaning the detector bar 2211. In some embodiments, in an initial state (e.g., at a time point when the control device 100 has just been activated), the processor 120 controls the slide 222 in the actuator 220 to drive the lift arm 221 over the washer 250 (i.e., the detector bar 2211 of the lift arm 221 is moved to a spot just above the washer 250) to prevent the camera circuit 110 from capturing images with the lift arm 221, the gripper 223, and the detector bar 2211 inside.

In some embodiments, a photographing direction of the camera circuit 110 is towards the tray 230 and parallel to the Z-axis direction, and the camera circuit 110 is disposed above the tray 230 to photograph the entire tray 230. In this way, the top-view image captured by the camera circuit 110 includes images of the caps of all sample bottles b1-bn on the trays 230. In some embodiments, the detection device 200 further includes an extraction fan 240 for extracting air from the chamber 210. In some embodiments, the camera circuit 110 is disposed below the extraction fan 240 to photograph the entire tray 230 without having the extraction fan 240 in the captured images. In some embodiments, the camera circuit 110 is disposed at any place in the chamber 210 that is capable of photographing the entire tray 230 and having the caps of all sample bottles b1-bn in the captured images, where the photographing direction of the camera circuit 110 may or may not be parallel to the Z-axis direction.

It should be noted that coordinate axes X, Y, and Z labeled in FIG. 2 are coordinate axes of a user coordinate system. In some embodiments, the user coordinate system is a three-dimensional coordinate system that is set by the user for a space in the chamber 210.

Figure 3:
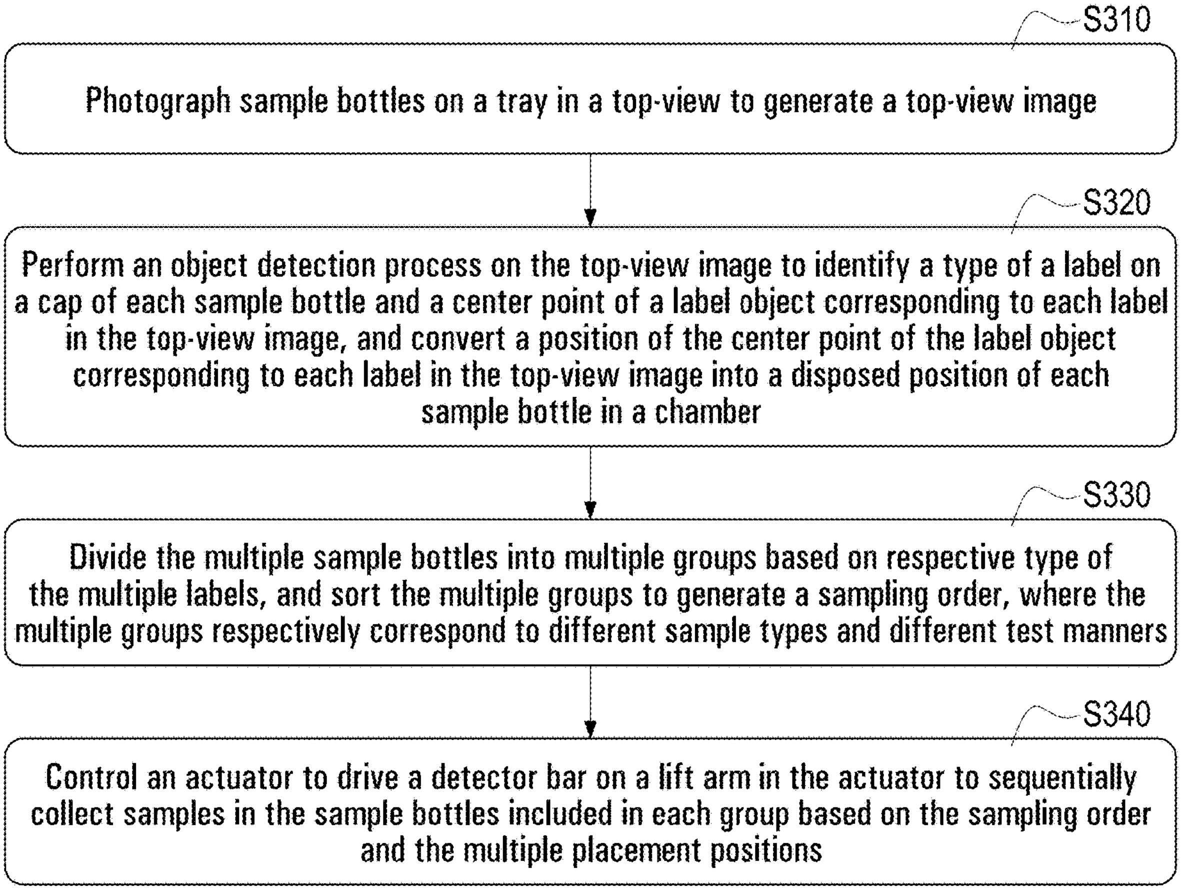
FIG. 3 illustrates a flowchart of a control method based on computer vision in some embodiments of the disclosure.

Reference is made to FIG. 3, and FIG. 3 illustrates a flowchart of a control method based on computer vision in some embodiments of the disclosure, and this control method is suitable for the control device 100 shown in FIG. 1.

As shown in FIG. 3, the control method includes steps S310-S340. First, in step S310, the camera circuit 110 photographs the sample bottles b1-bn on the trays 230 in a top-view to generate the top-view image. In some embodiments, each of the sample bottles b1-bn has the cap, and each cap has a label that corresponds to a sample type (i.e., various trace elements) of the sample contained in the respective sample bottle and a test manner to be used.

Figure 4:
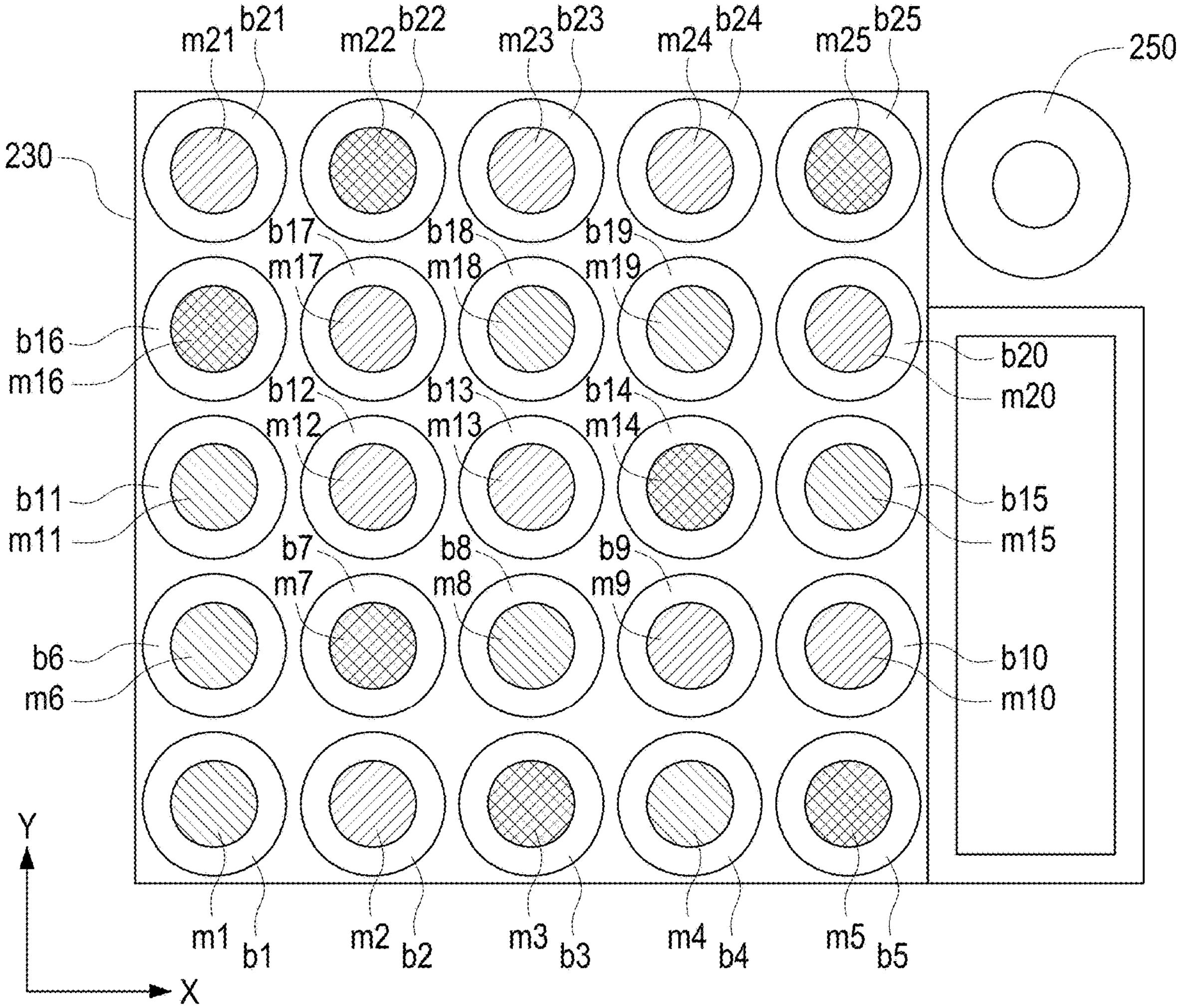
FIG. 4 illustrates a schematic diagram of a top-view of a tray in some embodiments of the disclosure.
Figure 5:
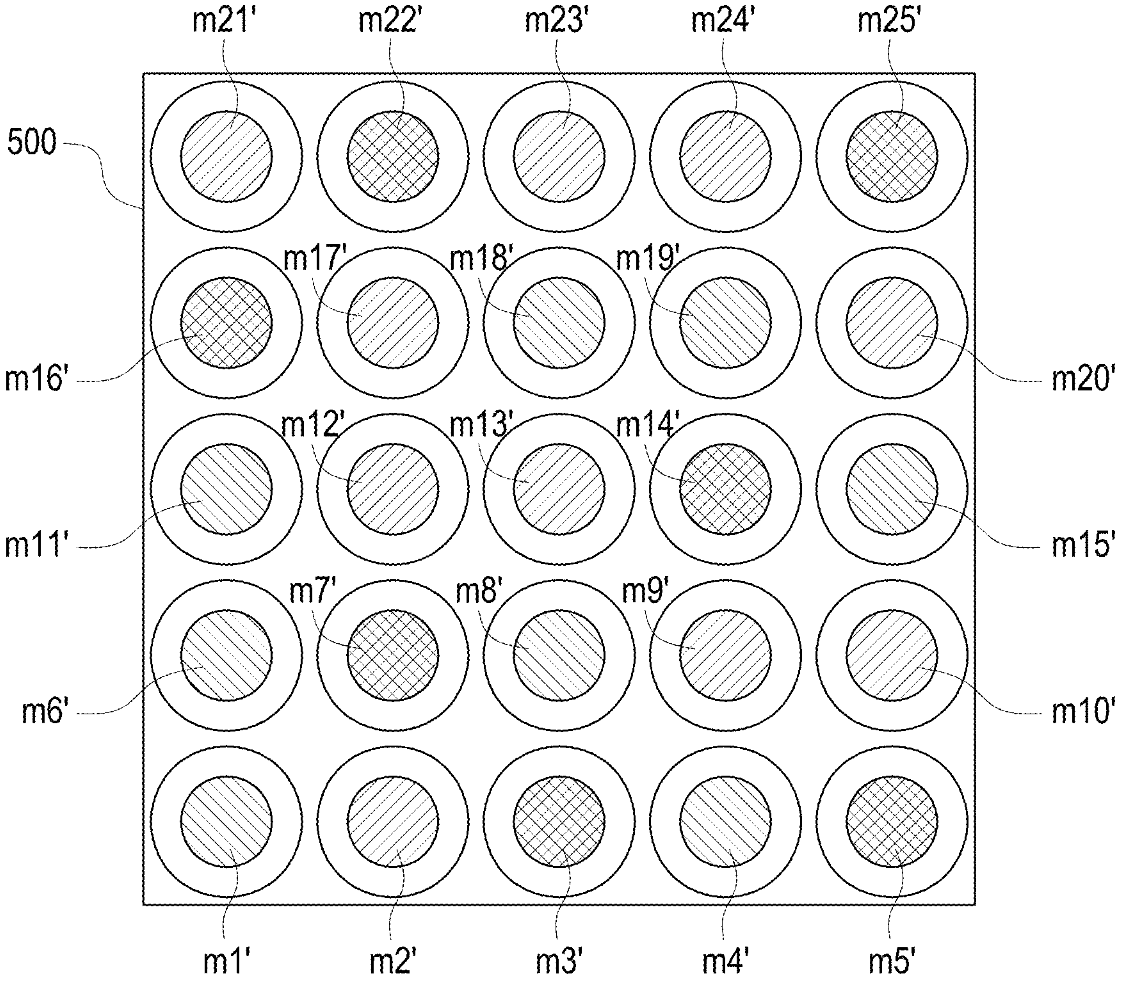
FIG. 5 illustrates a schematic diagram of an image to be tested in some other embodiments of the disclosure.

In some embodiments, these labels are multiple color labels, multiple shape labels, multiple barcode labels, multiple text labels, or multiple symbol labels. In some embodiments, different types of the labels correspond to different sample types and different test manners (e.g., atomic absorption spectrometry, electrochemical analysis, or biochemical analysis for the sample in the sample bottle, etc.). In some embodiments, the type of the label is a color type, a shape type, a barcode type, a text type, or a symbol type, etc. The above labels are explained below by a practical example. Reference is made to FIG. 4 and FIG. 5, where FIG. 4 illustrates a schematic diagram of a top-view of the tray 230 in some embodiments of the disclosure, and FIG. 5 illustrates a schematic diagram of an image 500 to be tested in some embodiments of the disclosure. As shown in FIG. 4, the tray 230 carries the sample bottles b1-b25, and the tray 230 is disposed adjacent to the washer 250. The caps of the sample bottles b1-b25 respectively have multiple labels m1-m25. In the disclosure, sizes of the sample bottles b1-b25 and sizes of the caps are the same, and the labels m1-m25 on the caps respectively correspond to the sample types of the samples contained in the sample bottles b1-b25 and/or the test manners to be used for the sample bottles b1-b25, where the same type of the sample and/or the same test manner corresponds to the same label.

In this embodiment, the labels m1-m25 are color labels (i.e., green, red, and blue). The labels m1, m4, m6, m8, m11, m15, m18, and m19 on the cap of the sample bottles b1, b4, b6, m8, m11, m15, m18, and m19 are green labels. The labels m2, m9, m10, m18, m19, b17, b20, b21, b23, and b24 on the cap of the sample bottles b2, b9, b10, m18, m19, m17, m20, m21, m23, and m24 are red labels. The labels m3, m5, m7, m14, m16, m22, and m25 on the cap of the sample bottles b3, b5, b7, b14, m16, m22, and m25 are blue labels. In other words, the sample bottles b1, b4, b6, b8, b11, b15, b18, and b19 contain same type of the sample are required to use the same test manner (e.g., first test manner) for testing the sample, the sample bottles b2, b9, b10, b18, b19, b17, b20, b21, b23, and b24 contain same type of the sample are required to use the same test manner (e.g., second test manner) for testing the sample, and the sample bottles b3, b5, b7, b14, b16, b22, and b25 contain same type of the sample are required to use the same test manner (e.g. third test manner) for testing the sample.

As shown in FIG. 5, the image 500 to be tested is an image generated by the camera circuit 110 through photographing the sample bottles b1-b25 on the tray 230 of FIG. 4 in the top-view. The image 500 to be tested includes multiple label objects m1'-m25' corresponding to the labels m1-m25 on the caps of the sample bottles b1-b25. The label objects m1'-m25' have various color types. The color types of the label objects m1', m4', m6', m8', m11', m15', m18', and m19' are green. The color types of the label objects m2', m9', m10', m18', m19', m17', m20', and m21 are red. The color types of the label objects m3', m5', m7', m14', m16', m22', and m25' are blue.

Figure 6:
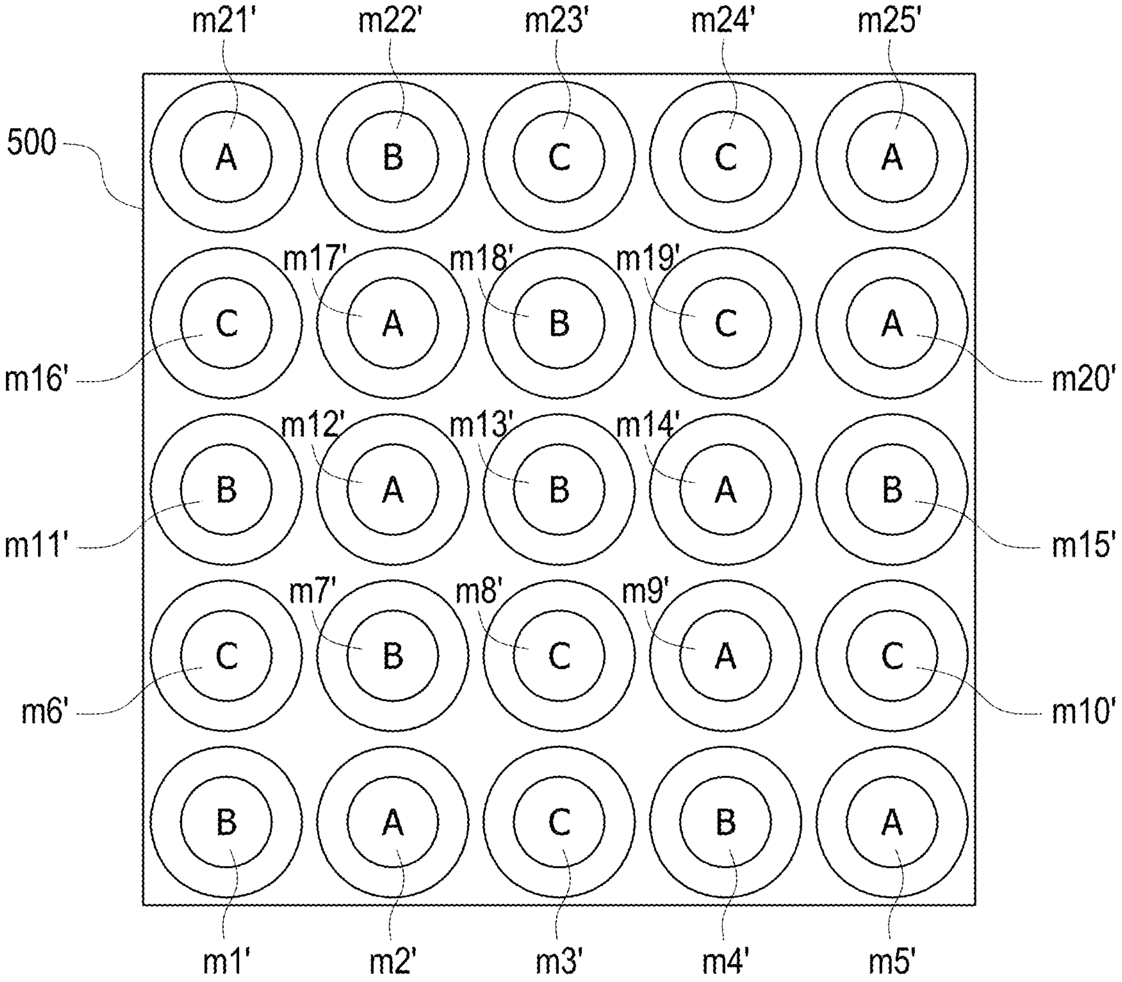
FIG. 6 illustrates a schematic diagram of an image to be tested in other embodiments of the disclosure.

Reference is made to FIG. 6, and FIG. 6 a schematic diagram of the image 600 to be tested in other embodiments of the disclosure. As shown in FIG. 6, in this embodiment, the labels m1-m25 can be the text labels (i.e., "A", "B", and "C"). The image 600 to be tested includes the label objects m1'-m25'. The label objects m1'-m25' have various text types. The text types of the label objects m1', m4', m7', m11', m15', m18', and m22' are text "B". The text types of the label objects m3', m9', m12', m14', m17', m20', m21', and m25' are text "A". The text types of the label objects m3', m6', m8', m10', m16', m19', m23', and m24' are text "C". In this embodiment, the same test manner (e.g., a first manner method) should be used for the multiple sample bottles with the label objects on the caps being the text "B", the same test manner (e.g., second test manner) should be used for the multiple sample bottles with the label objects on the caps being the text "A", and the same test manner (e.g. third test manner) should be used for the multiple sample bottles with the label objects on the caps being the text "C".

Back to FIG. 3, in step S320, the processor 120 performs an object detection process on the top-view image to identify the type (e.g., a color type or a text type) of the label on the cap of each sample bottle and a center point of the label object corresponding to each label in the top-view image, and converts a position of the center point of the label object corresponding to each label in the top-view image into a disposed position of each sample bottle in the chamber. In other words, the processor 120 applies the object detection process to identify the type of the label object and the position of the label object in the top-view image. In some embodiments, the processor 120 performs object detection process on the top-view image to identify a bounding box corresponding to each label object in the top-view image, and converts a position of a center point of the bounding box corresponding to each label object in the top-view image into the disposed position of each sample bottle in the chamber.

Figure 7:
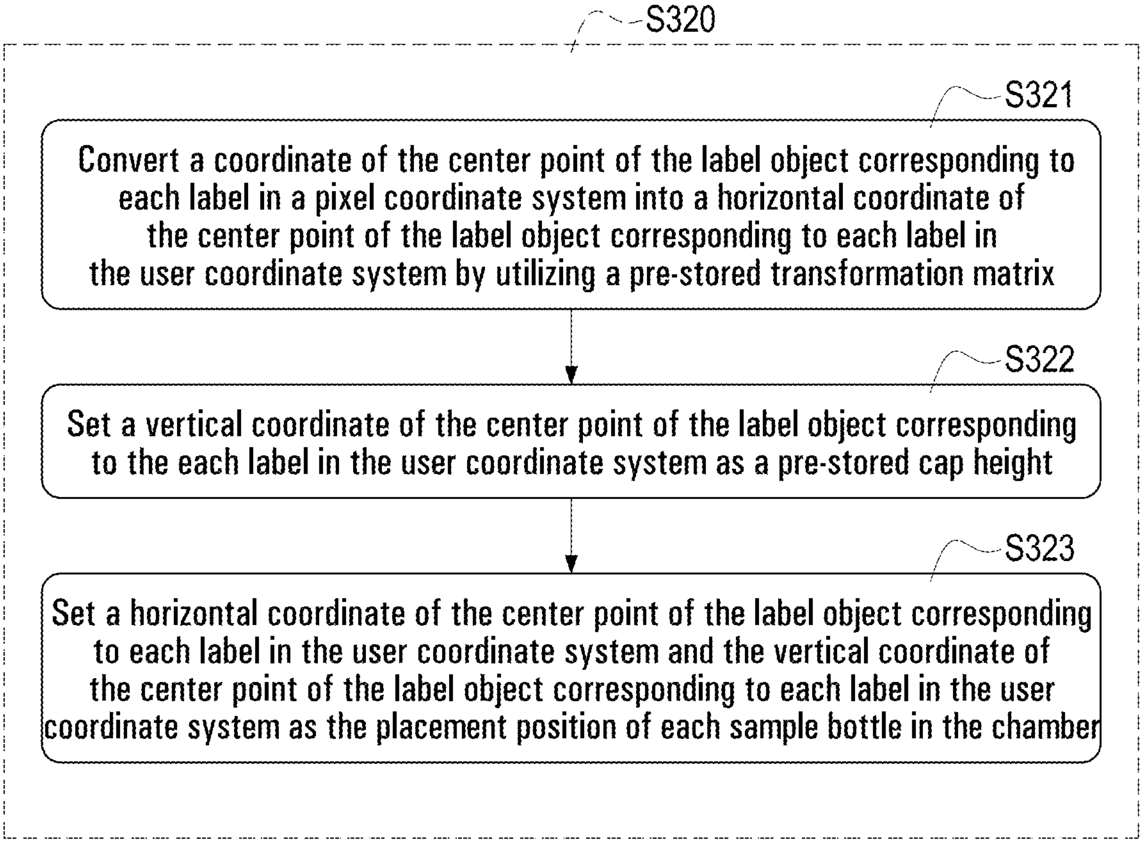
FIG. 7 illustrates a flowchart of detailed steps of one step of the control method based on computer vision in some embodiments of the disclosure.

Referring together to FIG. 7, FIG. 7 illustrates a flowchart of detailed steps S321-S323 in step S320 of FIG. 3 in some embodiments of the disclosure. As shown in FIG. 7, in step S321, the processor 120 converts a coordinate of the center point of the label object corresponding to each label in a pixel coordinate system into a horizontal coordinate (i.e., a coordinate in the XY plane) of the center point of the label object corresponding to each label in the user coordinate system by utilizing a pre-stored transformation matrix (e.g., which is pre-calculated by the processor 120).

In step S322, the processor 120 sets the vertical coordinate (i.e., the coordinate in the Z-axis direction) of the center point of the label object corresponding to each label in the user coordinate system as a pre-stored cap height (e.g., a height between a top edge of the cap of each sample bottle and a bottom of the chamber 210 is measured by the user in advance to be set as the cap height). In step S323, the processor 120 sets the horizontal coordinate of the center point of the label object corresponding to each label in the user coordinate system and the vertical coordinate of the center point of the label object corresponding to each label in the user coordinate system as the placement position of each sample bottle in the chamber 210.

In some embodiments, the processor 120 converts a coordinate of the center point of each bounding boxes in the pixel coordinate system into a horizontal coordinate of the center point of each bounding box in the user coordinate system by utilizing the pre-stored transformation matrix, and sets a vertical coordinate of the center point of each bounding box in the user coordinate system as the pre-stored cap height. Next, the processor 120 sets the horizontal coordinate of the center point of each bounding box in the user coordinate system and the vertical coordinates of the center point of each bounding box in the user coordinate system as the placement position of each sample bottle in the chamber 210.

In some embodiments, the transformation matrix indicates a correspondence (e.g., a homogeneous matrix) between the pixel coordinate system and the user coordinate system. In some embodiments, the pixel coordinate system is a two-dimensional coordinate system in the image to be tested.

In some embodiments, the object detection process performs object position detection and object categorization on the sample bottle images in the top-view image by utilizing a pre-trained object detection model. In some embodiments, the object detection model is a you only look once (YOLO) algorithm model, a convolutional neural network (CNN) model, or a combination of the above models. For example, the processor 120 pre-trains the YOLO algorithm model by utilizing multiple images having the above labels, training labels (i.e., the types of the above label) in each image, and the bounding boxes of the labels in each image. In this way, the control device 100 identifies the types (e.g., the color type is red) and the positions (i.e., the coordinates of the center points of the bounding boxes of the labels in the pixel coordinate system) of the labels on the caps of the sample bottles b1-bn in the top-view image by utilizing the trained YOLO algorithm model.

Figure 8:
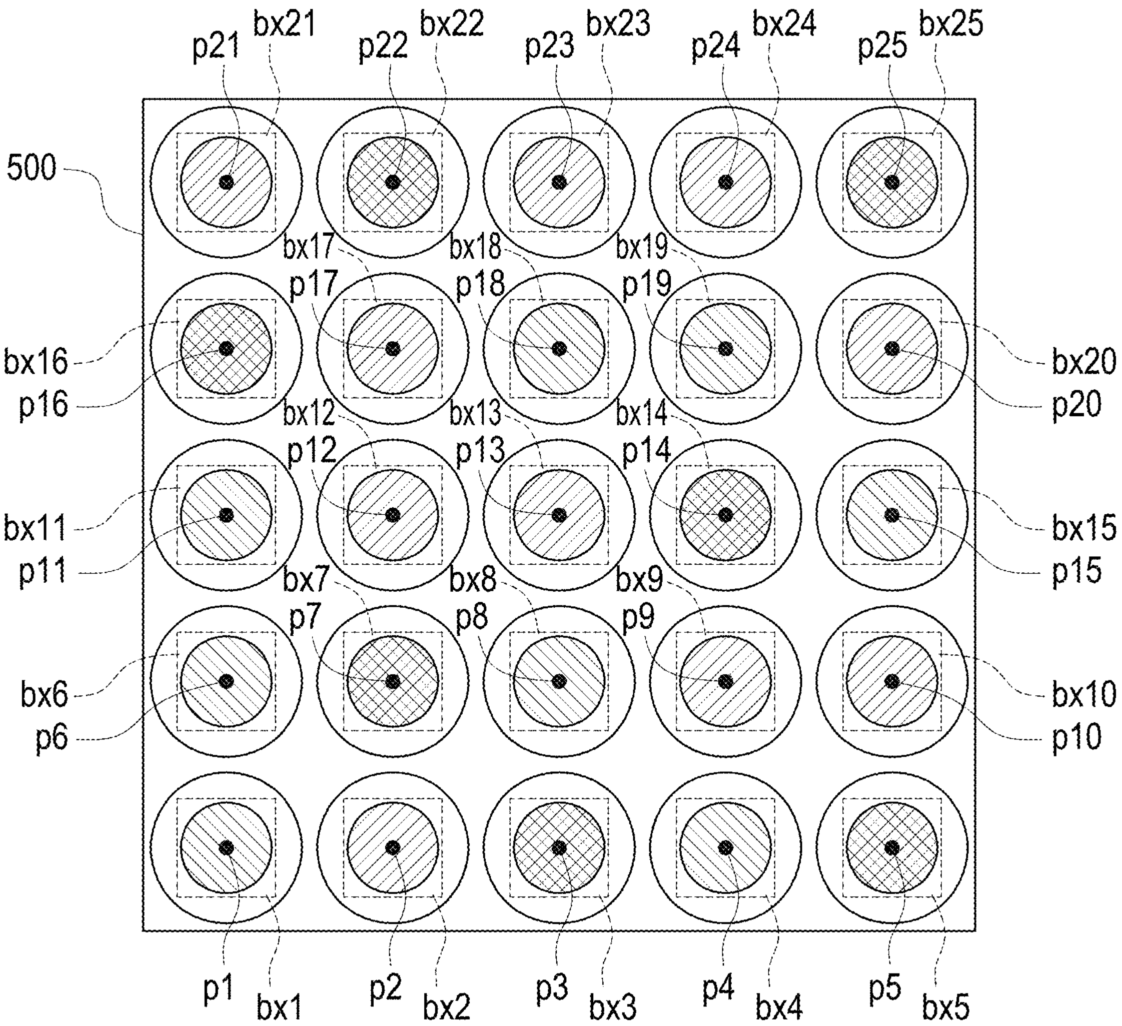
FIG. 8 illustrates a schematic diagram of multiple bounding boxes in some embodiments of the disclosure.

The above coordinate conversion is explained below by a practical example. Reference is made to FIG. 8, and FIG. 8 illustrates a schematic diagram of the multiple bounding boxes bx1-bx25 in some embodiments of the disclosure. As shown in FIGS. 5 and 8, continuing the example of FIG. 5, the processor 120 utilizes the YOLO algorithm model to identify respective type (i.e., the type of label on the cap of each sample bottle) of the label objects m1'-m25' from the top-view image 500 and the respective bounding boxes bx1~bx25 (i.e., the bounding box corresponding to each label) of the label objects m1'-m25', where the color types of the label objects m1', m4', m6', m8', m11', m15', m18', and m19 are green, the color types of the label objects m2', m9', m10', m18', m19', m17', m20', m21', m23', and m24' are red, and the color types of the label objects m3', m5', m7', m14', m16', m22', and m25' are blue.

Figure 9:
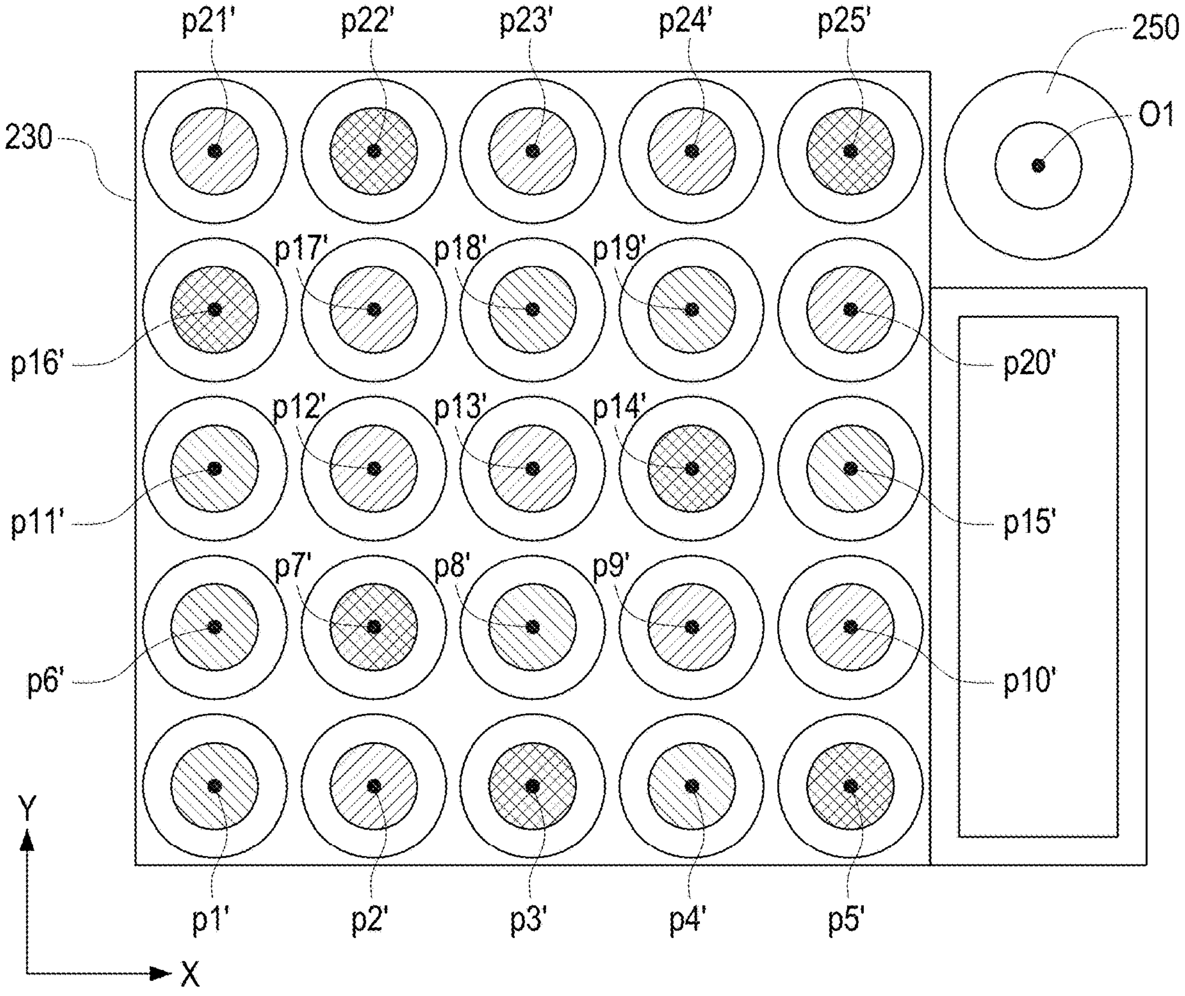
FIG. 9 illustrates a schematic diagram of multiple horizontal coordinates in some embodiments of the disclosure.

Reference is made to FIG. 9, and FIG. 9 illustrates a schematic diagram of the multiple horizontal coordinates p1'-p25' in some embodiments of the disclosure. As shown in FIG. 8 and FIG. 9, the processor 120 respectively converts the multiple coordinates p1-p25 of the center points of the bounding boxes bx1-bx25 in the pixel coordinate system into the multiple horizontal coordinates p1'-p25' of the center points of the bounding boxes bx1-bx25 in the user coordinate system by utilizing the pre-stored homogeneous matrix, and sets all vertical coordinates of the center points of the bounding boxes bx1-bx25 in the user coordinate system as the pre-stored cap height. If the multiple sample bottles b1-b25 have the same size, the multiple vertical coordinates are equal. Next, the processor 120 respectively sets the horizontal coordinates p1'-p25' of the center points of the bounding boxes bx1-bx25 in the user coordinate system and the vertical coordinates of the center points of the bounding boxes bx1-bx25 in the user coordinate system as the placement positions of the sample bottles in the chamber 210.

In some embodiments, the processor 120 first sets a center point O1 of a bottle neck of the washer 250 as a starting position of the detector bar 2211 on the lift arm 221 in the actuator 220. By controlling the camera circuit 110 to capture the top-view image when the lift arm 221 and the detector bar 2211 are on the starting position, the problem that the sample bottles may be difficult to be identified by the processor 120 because of the detector bar 2211 appearing in the top-view image and blocking some of the sample bottles can be avoided.

Back to FIG. 3, in step S330, the processor 120 divides the multiple sample bottles b1-b25 into multiple groups based on respective type of the multiple labels, and sorts the multiple groups to generate a sampling order, where the multiple groups respectively correspond to different sample types (e.g., a first sample, a second sample, a third sample, etc.) and different test manners (e.g., performing the atomic absorption spectrometry (AAS) for the first sample, the electrochemical spectrometry for the second sample, and the biochemical analysis for the third sample, etc.). In some embodiments, the processor 120 is set to sample the sample contained in the sample bottles in the same group (the sample bottles in the same group should be containing the same sample type of sample) in the same time sequence for the same test manner (e.g., sampling the sample in one or more sample bottles of a first group for the atomic absorption spectrometry in a first time sequence, sampling the sample in one or more sample bottles of a second group for the electrochemical analysis in a second time sequence after the first time sequence, and sampling the sample in one or more sample bottles in a third group for the biochemical analysis in a third time sequence after the second time sequence).

Figure 10:
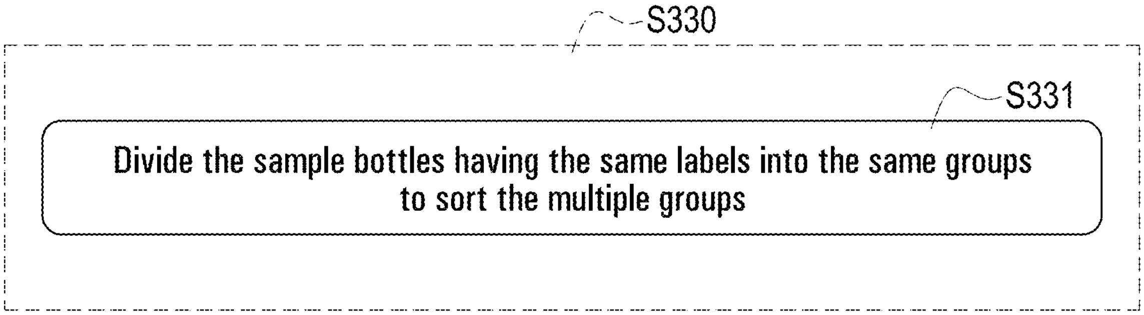
FIG. 10 illustrates a flowchart of a detailed step in another step of the control method based on computer vision in some embodiments of the disclosure.

Reference is made to FIG. 10, and FIG. 10 illustrates a flowchart of a detailed step S331 in step S330 of FIG. 3 in some embodiments of the disclosure. As shown in FIG. 10, in step S331, the processor 120 divides the sample bottles having the labels of same type (e.g., the labels having the same color or the labels having the same text) into the same group to sort the multiple groups. In some embodiments, the processor 120 randomly samples the multiple sample bottles in the same group or samples the sample bottles in the same group in a particular order (e.g., the sample bottle closer to an origin of the user coordinate system in FIG. 2 is sampled first). In some embodiments, the sampling order indicates the sampling priority of each group.

For example, as shown in FIG. 4 and FIG. 5, the processor 120 has identified that the color types of the label objects m1', m4', m6', m8', m11', m15', m18', and m19' are green, the color types of the label objects m2', m9', m10', m18', m19', m17', m20', m21', m23', and m24' are red, and the color types of the label objects m3', m5', m7', m14', m16', m22', and m25' are blue. Therefore, the processor 120 divides the sample bottles b1, b4, b6, b8, b11, b15, b18, and b19 into the first group, divides the sample bottles b2, b9, b10, b18, b19, b17, b20, b21, b23, b24 into the second group, and divides the sample bottles b3, b5, b7, b14, b16, b22, and b25 into the third group. Next, the processor 120 sequentially arranges the first group to the third group to generate the sampling order (i.e., an order in which the first group to the third group are sampled sequentially), where the sampling order indicates the sampling priority of each of the first group to the third group.

Figure 11:
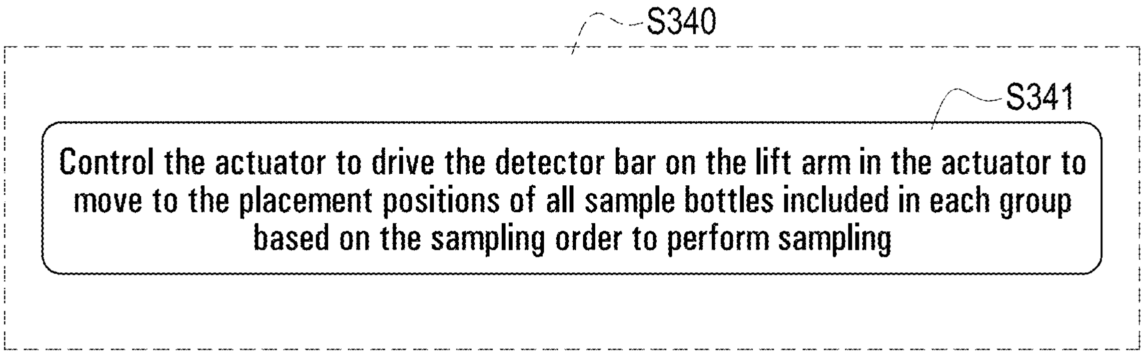
FIG. 11 illustrates a flowchart of a detailed step in another step of the control method based on computer vision in some embodiments of the disclosure.

Back to FIG. 3, in step S340, the processor 120 controls the actuator 220 to drive the detector bar 2211 on the lift arm 221 in the actuator 220 to sequentially collect the samples in the sample bottles included in each group based on the sampling order and the multiple placement positions. Reference is made to FIG. 11, and FIG. 11 illustrates a flowchart of a detailed step S341 in step S340 of FIG. 3 in some embodiments of the disclosure. As shown in FIG. 11, in step S341, the processor 120 controls the actuator 220 to drive the detector bar 2211 on the lift arm 221 in the actuator 220 to move to the placement positions of all sample bottles included in each group based on the sampling order to perform sampling.

For example, as shown in FIG. 4, continuing the previous example, assuming that the processor 120 has sequentially arranged the first group to the third group and generated the sampling order, in the first time sequence, the processor 120 controls the actuator 220 to drive the detector bar 2211 on the lift arm 221 in the actuator 220 from the starting position (i.e., a center point of the bottle neck of the above washer 250) to sequentially move to the placement positions of the multiple sample bottles b1, b4, b6, b8, b11, b15, b18, and b19 in the first group, so that sequentially collects the samples in these sample bottles b1, b4, b6, b8, b11, b15, b18, and b19 and performs the test manner (e.g., the atomic absorption spectrometry) corresponding to the first group.

Next, in the second time sequence after the first time sequence, the processor 120 controls the actuator 220 to drive the detector bar 2211 on the lift arm 221 of the actuator 220 from the placement position of the last sampled sample bottle (e.g., the sample bottle b19) to sequentially move to the placement positions of the multiple sample bottles b2, b9, b10, b18, b19, b17, b20, b21, b23, and b24 in the second group, so that sequentially collects the samples in these sample bottles b2, b9, b10, b18, b19, b17, b20, b21, b23, and b24 and performs the test manner (e.g., the electrochemical analysis) corresponding to the second group. Next, in the third time sequence after the second time sequence, the processor 120 controls the actuator 220 to drive the detector bar 2211 on the lift arm 221 of the actuator 220 from the placement position of the last sampled sample bottle (e.g., the sample bottle b24) to sequentially move to the placement positions of the multiple sample bottles b3, b5, b7, b14, b16, b22, b25 in the third group, so that sequentially collects the samples in these sample bottles b3, b5, b7, b14, b16, b22, and b25 and performs the test manner (e.g., the biochemical analysis) corresponding to the third group.

In other words, sample bottles for the same testing manner are sampled in the same time sequence. In this way, the processor 120 samples and tests a large number of the sample bottle that are performed in the same test manner once. Therefore, the processor 120 does not need to frequently switch different test manners during the sampling and detection process, and thus the sampling and detection efficiency of all sample bottles b1-bn is improved.

In some embodiments, the processor 120 controls the actuator 220 to drive the gripper 223 to grip the cap of each sample bottle before sampling for the sample bottles, and rotates to a position parallel to the tray 230 based on the pivot 2231 to remove the cap of each sample bottle. After completing the sampling operation for each sample bottle by the detector bar 2211, the processor 120 then controls the actuator 220 to drive the gripper 223 to rotate to a position perpendicular to the tray 230 based on the pivot 2231 to place the cap back on each sample bottle.

In summary, the control device and method based on computer vision proposed in the disclosure automatically divide the sample bottles into groups by the object detection, so that the samples in the sample bottles requiring the same testing manner are consecutively sampled in the same time sequence. In this way, the control device and method based on computer vision proposed in the disclosure effectively improve the sampling and testing efficiency by eliminating the need to continuously switch different testing manners during the sampling and testing process. In addition, since the control device and method based on computer vision proposed in the disclosure automatically divide the sample bottles into groups, the user does not need to place the sample bottles on the tray in a specific way in advance. Therefore, the labor and the time are saved for quickly detecting the samples in the sample bottles.

While this disclosure has been described by means of specific embodiments, numerous modifications and variations may be made thereto by those skilled in the art without departing from the scope and spirit of this disclosure set forth in the claims.

What is claimed is:

1. A control method based on computer vision for a detection device comprising a chamber, a tray, and an actuator, wherein the control method comprises:

by a camera circuit disposed above the tray, photographing a plurality of sample bottles on the tray to generate a top-view image;

by a processor, performing an object detection process on the top-view image to identify a type of a label on a cap of each of the sample bottles and a center point of a label object corresponding to each of the labels in the top-view image, and converting a position of each of the center points in the top-view image into a placement position of each of the sample bottles in the chamber, wherein comprises:

by the processor, converting a coordinate of each of the center points in a pixel coordinate system into a horizontal coordinate of each of the center points in a user coordinate system by utilizing a pre-stored transformation matrix;

by the processor, setting a vertical coordinate of each of the center points in the user coordinate system as a cap height; and by the processor, setting the horizontal coordinate of each of the center points in the user coordinate system and the vertical coordinate of each of the center points in the user coordinate system as the placement position of each of the sample bottles in the chamber;

by the processor, dividing the plurality of sample bottles into a plurality of groups based on respective type of the plurality of labels, and sorting the plurality of groups to generate a sampling order, wherein the plurality of groups respectively correspond to different testing manners and different sample types; and by the processor, controlling the actuator to drive a detector bar on a lift arm in the actuator to sequentially collect samples in the sample bottles comprised in each of the plurality of groups based on the sampling order and the plurality of placement positions.

2. The control method based on computer vision of claim 1, wherein the plurality of labels is a plurality of color labels, a plurality of shape labels, a plurality of barcode labels, a plurality of text labels, or a plurality of symbol labels.

3. The control method based on computer vision of claim 1, wherein the step of dividing the plurality of sample bottles into the plurality of groups based on the respective types of the plurality of labels, and sorting the plurality of groups to generate the sampling order comprises:

by the processor, dividing the sampling bottles having the labels of same type into the same groups to sort the plurality of groups.

4. The control method based on computer vision of claim 1, the step of controlling the actuator to drive the detector bar on the lift arm in the actuator to sequentially collect the samples in the sample bottles comprised in each of the plurality of groups based on the sampling order and the plurality of placement positions comprises:

by the processor, controlling the actuator to drive the detector bar on the lift arm in the actuator to move to the placement positions of all of the sample bottles comprised in each of the plurality of groups based on the sampling order to perform sampling.

5. A control device based on computer vision for controlling a detection device comprising a chamber, a tray, and an actuator, wherein the control device comprises:

a camera circuit, disposed above the tray, and configured for photographing a plurality of sample bottles on the tray to generate a top-view image; and a processor, connected to the camera circuit, configured for executing following steps:

performing an object detection process on the top-view image to identify a type of a label on a cap of each of the sample bottles and a center point of a label object corresponding to each of the labels in the top-view image, and converting a position of each of the center points in the top-view image into a placement position of each of the sample bottles in the chamber, wherein comprises:

converting a coordinate of each of the center points in a pixel coordinate system into a horizontal coordinate of each of the center points in a user coordinate system by utilizing a pre-stored transformation matrix;

setting a vertical coordinate of each of the center points in the user coordinate system as a cap height; and setting the horizontal coordinate of each of the center points in the user coordinate system and the vertical coordinate of each of the center points in the user coordinate system as the placement position of each of the sample bottles in the chamber;

dividing the plurality of sample bottles into a plurality of groups based on respective type of the plurality of labels, and sorting the plurality of groups to generate a sampling order, wherein the plurality of groups respectively correspond to different testing manners and different sample types; and controlling the actuator to drive a detector bar on a lift arm in the actuator to sequentially collect samples in the sample bottles comprised in each of the plurality of groups based on the sampling order and the plurality of placement positions.

6. The control device based on computer vision of claim 5, wherein the plurality of labels is a plurality of color labels, a plurality of shape labels, a plurality of barcode labels, a plurality of text labels, or a plurality of symbol labels.

7. The control device based on computer vision of claim 5, wherein in the step of dividing the plurality of sample bottles into the plurality of groups based on the respective types of the plurality of labels, and sorting the plurality of groups to generate the sampling order, the processor is configured for executing following steps:

dividing the sampling bottles having the labels of same type into the same groups to sort the plurality of groups.

8. The control device based on computer vision of claim 5, in the step of controlling the actuator to drive the detector bar on the lift arm in the actuator to sequentially collect the samples in the sample bottles comprised in each of the plurality of groups based on the sampling order and the plurality of placement positions, the processor is configured for executing following steps:

controlling the actuator to drive the detector bar on the lift arm in the actuator to move to the placement positions of all of the sample bottles comprised in each of the plurality of groups based on the sampling order to perform sampling.

* * * * *